(12) United States Patent
Winstead

(10) Patent No.: US 8,027,778 B2
(45) Date of Patent: Sep. 27, 2011

(54) TORQUE DELIVERY

(75) Inventor: Vincent J. Winstead, Mankato, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 953 days.

(21) Appl. No.: 11/755,402

(22) Filed: May 30, 2007

(65) Prior Publication Data

US 2008/0300773 A1 Dec. 4, 2008

(51) Int. Cl.
*F02D 41/00* (2006.01)
(52) U.S. Cl. ...................................... 701/105
(58) Field of Classification Search .......... 701/103–105; 123/295, 299, 305, 348, 90.11, 90.15, 478, 123/480, 481
See application file for complete search history.

(56) References Cited

U.S. PATENT DOCUMENTS

| | | | |
|---|---|---|---|
| 6,390,054 B1 | 5/2002 | Yang | |
| 6,681,751 B1 | 1/2004 | Ma | |
| 7,730,870 B2 * | 6/2010 | Michelini et al. | 701/103 |
| 2004/0182359 A1 | 9/2004 | Stewart et al. | |

FOREIGN PATENT DOCUMENTS

EP 1612393 1/2006

* cited by examiner

*Primary Examiner* — Hieu T Vo
(74) *Attorney, Agent, or Firm* — Allan J. Lippa; Alleman Hall McCoy Russell & Tuttle LLP

(57) ABSTRACT

A system for controlling a multiple cylinder internal combustion engine having a plurality of cylinders with electronically actuated valves (EVA) is presented. The system is designed to improve the torque delivery of an EVA engine that operates a portion of cylinders in an HCCI combustion mode.

22 Claims, 5 Drawing Sheets

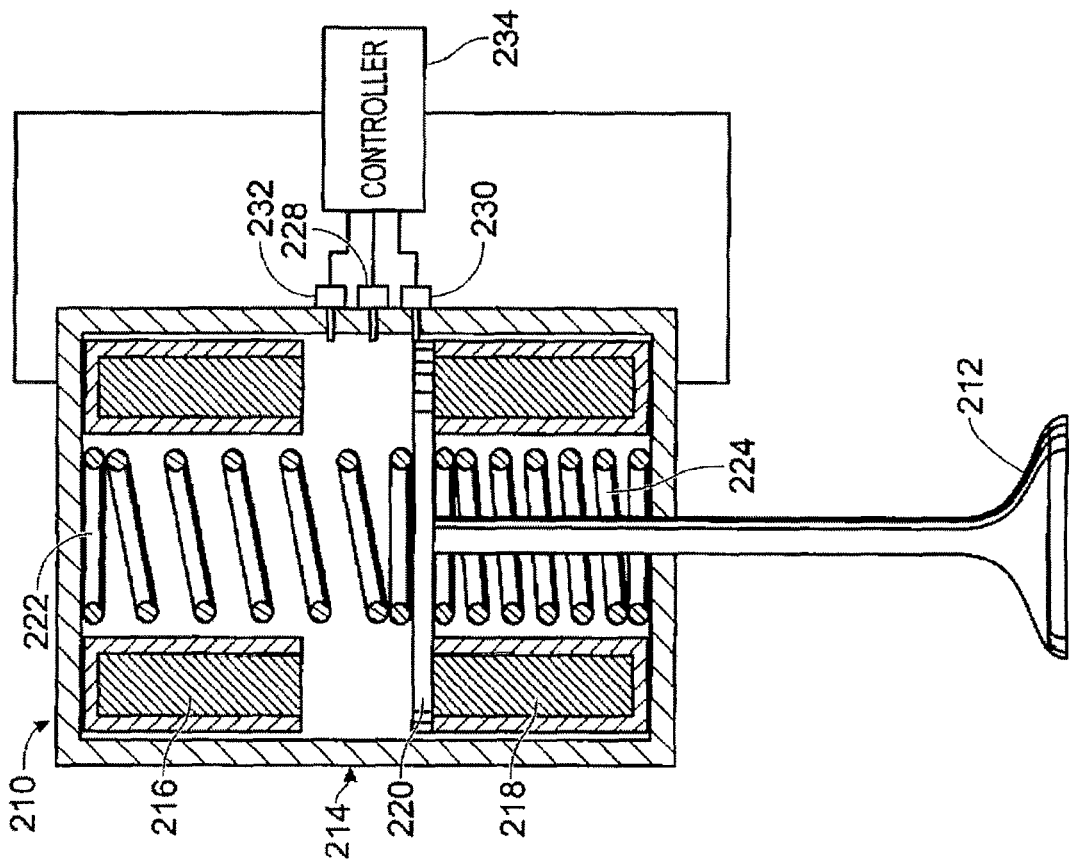
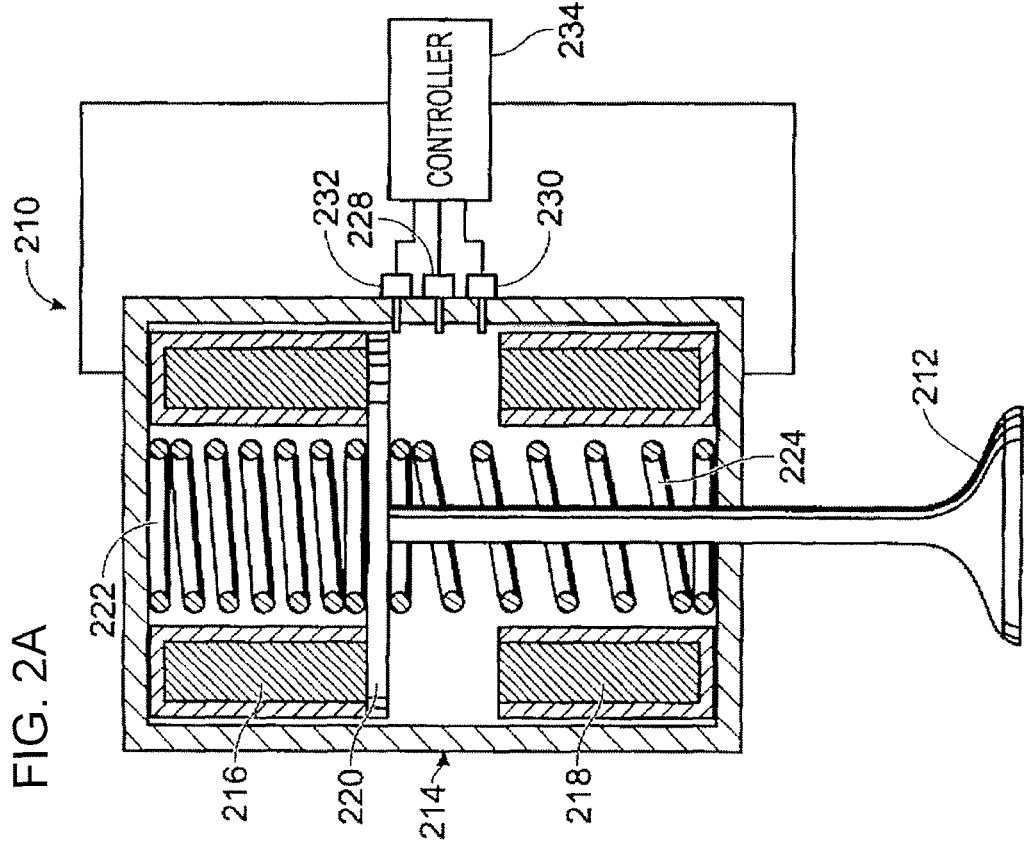

TORQUE DELIVERY

FIELD

The present application relates to controlling torque delivery in an engine.

BACKGROUND

Vehicles having an internal combustion engine can operate in a variety of modes. As one example, an engine may operate in a spark ignition (SI) mode, wherein a charge of a mixture of air and fuel is ignited by a spark performed by a sparking device within a combustion chamber. As another example, an engine may operate in a compression ignition mode, wherein a mixture of air and fuel are compressed within a combustion chamber by a piston, causing ignition of the charge without necessarily requiring the addition of a spark from a sparking device.

One type of compression ignition known as homogeneous charge compression ignition (HCCI) utilizes compression of a substantially homogeneous mixture of air and fuel to achieve controlled auto-ignition (CAI). In HCCI engines, ignition occurs virtually simultaneously throughout a combustion chamber as a result of compression instead of spark ignition, making the combustion process challenging to control. HCCI engines are similar to conventional gasoline engines in having a homogeneous charge, but are similar to conventional diesel engines in having compression ignition. HCCI engines may be used to combine gasoline engine low emissions with diesel engine efficiency.

HCCI combustion engines typically change operation conditions more slowly than other combustion processes. The engine hardware used to control initial cylinder conditions such as internal residuals, intake air temperatures, and the combustion process stability window, limits dynamic response. Further, during HCCI operation and while transitioning to and from an HCCI combustion mode, undesired torque pulses can negatively impact driving torque response and noise, vibration and harshness.

In one approach, as described in U.S. Pat. No. 6,390,054, issued to Yang, an engine controller smoothes transitions between combustion modes by transitioning a first cylinder group between combustion modes and at a different time transitioning a second cylinder group between combustion modes. In another approach, as described in European Patent Application EP 1612393, by Almkvist et al., a method is provided for controlling a four-stroke multi-cylinder spark ignition combustion engine using cylinder deactivation of a subgroup of cylinders while another subgroup is working, during operation with an engine torque below a predetermined level. Almkvist further discusses a low engine speed strategy of operating inlet and exhaust valves normally and gradually opening a throttle until maximum engine stability is achieved.

However, the inventors herein have recognized disadvantages with either approach. First, an approach that smoothes undesired torque pulses while transitioning two separate cylinder groups between an HCCI combustion mode and a non-HCCI combustion mode, does not address undesired torque pulses arising from non-HCCI cylinders when an engine is no longer transitioning cylinders between combustion modes. Second, an approach that operates engine valves normally for non-HCCI cylinders and modulates a throttle for torque balancing affects all cylinders served by the throttle, irrespective of if the cylinders operate in HCCI mode.

The inventors herein have recognized the above-mentioned disadvantages and have developed a system that improves torque delivery in an engine with a first portion of cylinders operating in HCCI combustion mode and a second portion of cylinders not firing.

SUMMARY

One example approach to overcome at least some of the disadvantages of prior approach includes operating a first portion of the cylinders in a homogeneous charge compression ignition (HCCI) mode, cycling a second portion of the cylinders in a non-firing mode, opening at least one valve in the second portion of cylinders to adjust the pumping work of the second portion of cylinders, and adjusting at least one of the valve timing, duration and lift of the at least one valve in the second portion of cylinders to smooth the torque delivery of the engine.

In a second approach, also described herein, the above issues may be addressed by a system for controlling a multiple cylinder internal combustion engine having a plurality of cylinders with electronically actuated valves, the system including a first portion of cylinders to operate in a homogeneous charge compression ignition (HCCI) mode, a second portion of cylinders to operate in a non-firing mode, and an engine controller operably coupled to electronically actuated valves of the first and second portions of cylinders, said controller configured to actuate at least one valve in the second portion of cylinders to adjust the pumping work of the second portion of cylinders, wherein the engine controller is configured to adjust at least one of the valve timing, duration and lift of the at least one valve in the second portion of cylinders to smooth the torque delivery of the engine.

The present description provides several advantages. In particular, EVA provides improved control over pumping losses to provide smooth torque delivery. Further, EVA allows use of brake torque to provide smooth torque delivery. Additionally, and EVA approach to smooth torque delivery can operate on a cylinder by cylinder basis instead of affecting all cylinders using a common throttle. Further, and EVA approach to torque smoothing can be used on either intake only or exhaust only valves to not disturb other cylinders operating in HCCI mode or other cylinders or exhaust emissions while a cylinder is transitioning between combustion modes.

DESCRIPTION OF THE DRAWINGS

FIGS. 2A and 2B are schematic diagrams of an example electric valve actuation system in a first position and a second position.

DETAILED DESCRIPTION

Figure 1:
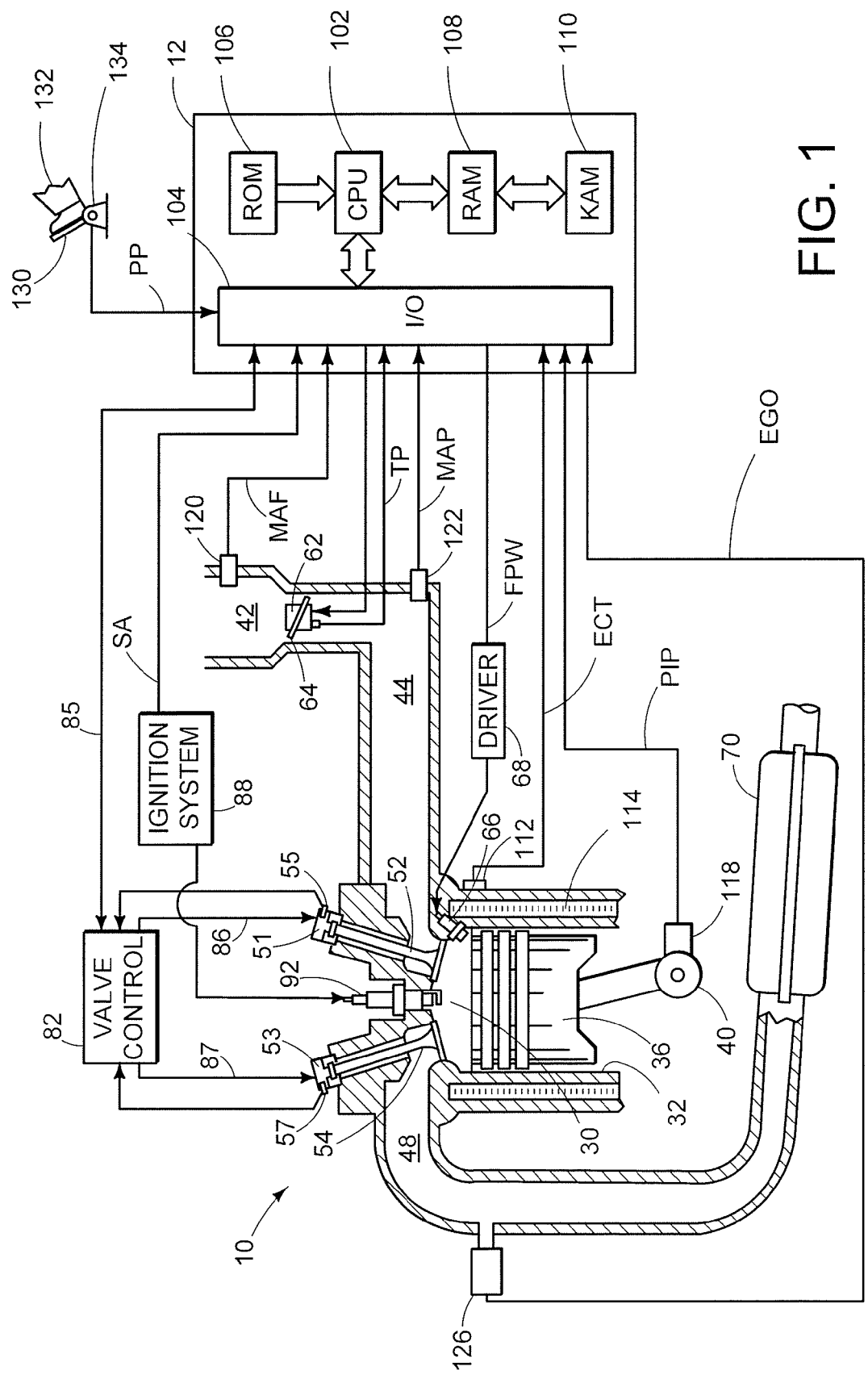
FIG. 1 is a schematic diagram of a portion of an example internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via valve controller 82 and electric valve actuator (EVA) 51. Valve controller 82, also called a slave controller or valve control unit (VCU), is shown coupled with controller 12 over link 85, but other embodiments may include more than 1 valve controller 82. In some embodiments link 85 is a high speed control area network (CAN) operating at 500 kbit/sec data bandwidth, but embodiments are not so limited and may operate at other speeds or may be other communication channels that adequately provide data transfer between controller 12 and one or more valve controllers 82. Valve controller 82 is in communication with electronic valve actuators 51 and 53 through links 86 and 87 and controls the opening and closing of the respective intake valve 52 and exhaust valve 54. Similarly, exhaust valve 54 may be controlled by controller 12 via valve controller 82 and EVA 53.

During some conditions, valve controller 82 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example.

Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark or spark plug 92.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus.

Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa.

During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. As described above, FIG. 1 shows only one cylinder of a multi-cylinder engine, and that each cylinder may similarly include its own set of intake/exhaust valves, fuel injector, spark plug, etc.

Figure 2C:
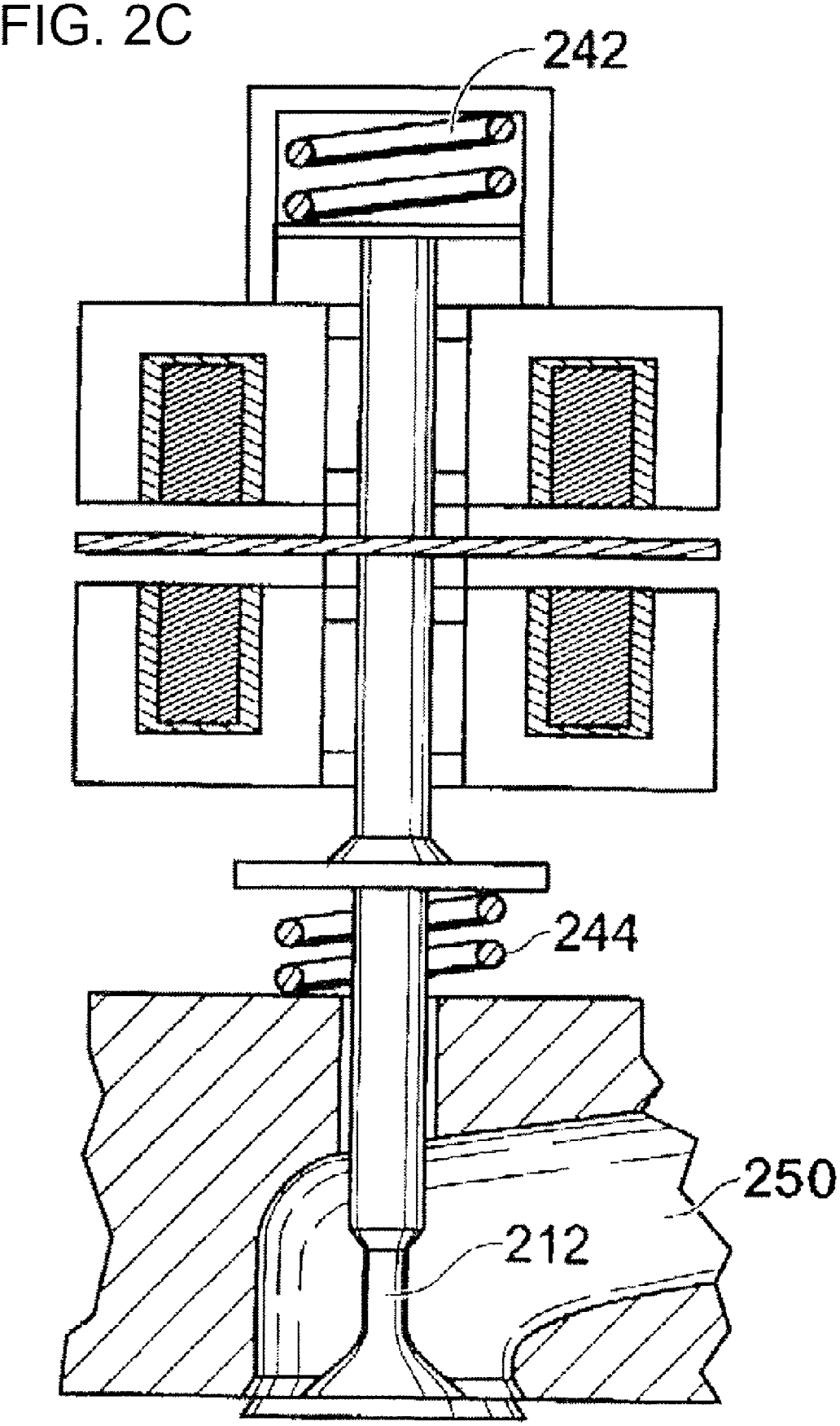
FIG. 2C is a schematic diagram of an example electric valve actuation system as further described in this disclosure.

FIGS. 2A, 2B, and 2C show a detailed view of an EVA system and valve that may be used as one of the intake or exhaust valves described above with reference to FIG. 1. Referring to FIGS. 2A and 2B, an EVA system 210 is shown for controlling movement of a valve 212 of a cylinder between a fully closed position (shown in FIG. 2A), and a fully open position (shown in FIG. 2B). The apparatus 210 includes an electric valve actuator (EVA) 214 with upper and lower coils 216 and 218 which electromagnetically drive an armature 220 against the force of upper and lower springs 222 and 224 for controlling movement of the valve 212.

One or more sensors 228, 230, and 232 may be provided for detecting a position, velocity and/or acceleration of armature 220. As one embodiment, at least one of sensors 228, 230, and 232 may include a switch type sensor that detects when armature 220 passes within a region of the sensor. In some embodiments, at least one of sensors 228, 230, and 232 may provide continuous position, velocity, and/or acceleration data to the control system for the armature and/or valve position.

Controller 234, which can be combined into controller 12, or act as a separate controller portion of the control system is shown operatively connected to position sensors 228, 230, and 232, and to the upper and lower coils 216 and 218 to control actuation and landing of valve 212. As described above, engine 10 has one or more electric valve actuators that may be used to vary the lift height, lift duration, and/or opening and closing timing in response to operating conditions of the engine.

FIG. 2C shows an alternative embodiment of an EVA system including a dual coil oscillating mass actuator with an engine valve actuated by a pair of opposing electromagnetic coils (e.g. solenoids), which are designed to overcome the force of a pair of opposing valve springs 242 and 244 arranged differently than the actuator of FIGS. 2A and 2B. Other components of the electric valve actuation system of FIG. 2C may be similar to those of FIGS. 2A and 2B, except that FIG. 2C shows port 250, which can be an intake or exhaust port of a cylinder of the engine. Applying a variable voltage to the coil of the electromagnet induces current to flow, which controls the force produced by each electromagnet. With some EVA systems, each electromagnet that makes up an actuator may be only able to produce a force in one direction, independent of the polarity of the current in its coil.

As illustrated above, the electrically actuated valves in the engine may remain in a half open position when the actuators are de-energized (e.g. no current is supplied). Therefore, prior to a combustion operation of the cylinder, each valve may go through an initialization cycle. During an initialization cycle, the actuators can be pulsed with current, in a prescribed manner, in order to establish the valves in the fully closed or fully open position. Further, as will be described below in greater detail, the initialization cycle may include a determination of a base level of holding current for one or more magnetic coils of the EVA system.

Following this initialization, the valves can be sequentially actuated according to the desired valve timing and firing order by the pair of electromagnetic coils, a first electromagnetic coil (e.g. the lower coil) for pulling the valve open and a second electromagnetic coil (e.g. the upper coil) for pulling the valve closed.

The magnetic properties of each electromagnet may be such that only a single electromagnetic coil (upper or lower) need be energized at any time. Since one of the coils (e.g. the upper coil) holds the valve closed for the majority of each engine cycle, it may be operated for a much higher percentage of time than that of the other coils (e.g. the lower coil).

Referring back to FIG. 1, engine 10 has cam-less independently variable intake and exhaust valves. This methodology could apply to any combination of variable intake and/or exhaust valve trains as well as EVA and mechanically driven valves. The valves are actuated using valve controller 82 where controller 12 may be the vehicle ECU and referred to as the master controller or master ECU.

In an embodiment system 10 as illustrated in FIG. 1, controller 12 may communicate with valve control unit 82 and actuate valves 52 and 54 to provide torque smoothing to counter torque pulses provided by other cylinders operating in an HCCI combustion mode. For example, a first portion of cylinders may operate in a homogeneous charge compression ignition (HCCI) mode (not shown), while at least one other cylinder 32 operates in a non-firing mode. Engine controller 12 may be operably coupled to electronically actuated valves 52 and 54 of each cylinder, wherein controller 12 is configured to actuate at least one valve 52 in the non-firing cylinder(s) to adjust the pumping work engine. Further, by using EVA to adjust the pumping work of the engine, controller 12 has greater control to adjust the actuation of the at least one valve 52 to smooth the torque delivery of the engine.

In the present embodiment, engine controller 12 may use EVA to adjust valve timing, valve duration and valve lift valve 52, or more valves, to smooth the torque delivery of the engine. Valve timing, valve duration, and valve lift may be actuated in various combinations or even individually in various embodiments. Further, engine controller 12 can be configured to respond to a transient event in HCCI cylinders or due to other causes, and actuate valve 52 according to the transient event. For example, if the magnitude of an undesired torque pulse from the transient event can be measured or predicted, controller 12 can use EVA to adjust the pumping losses or brake torque of one or more cylinders to at least partially compensate for the undesired torque and provide a more smooth torque delivery. Additionally, engine controller 12 may be configured to detect a transition to or from and HCCI mode in the HCCI or non-HCCI cylinders and use EVA to adjust the pumping losses or brake torque of one or more cylinders to at least partially compensate for the undesired torque and provide a more smooth torque delivery.

In some embodiments, EVA may be used to adjust only a portion of the valves to provide torque smoothing. For example, when cylinders are transitioning between combustion modes, one embodiment may adjust only the intake valves of non-firing cylinders in order to provide better emissions control or in general to not adjust either intake or exhaust gases that effect the operation of other cylinders. Some embodiments may use EVA to adjust both intake and exhaust valves to provide greater control over pumping work, or may even actuate a valve(s) to provide brake torque to smooth the torque delivery of the engine.

Figure 3:
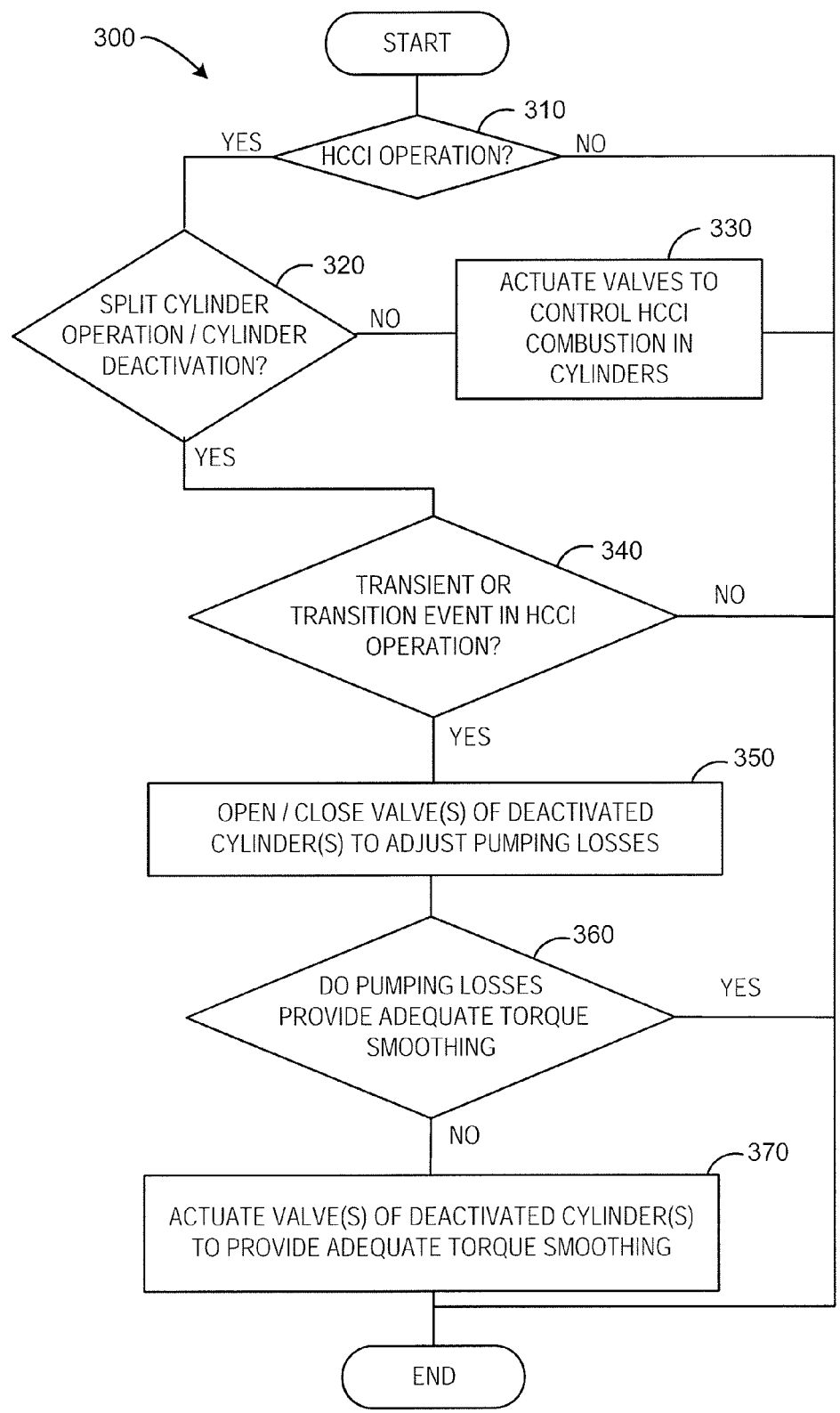
FIG. 3 is a flow diagram of an embodiment method to control torque delivery in a homogeneous charge compression ignition engine having a plurality of cylinders using electronic valve actuation.

FIG. 3 is a flow diagram of an embodiment method 300 to control torque delivery in a homogeneous charge compression ignition engine having a plurality of cylinders using electronic valve actuation. In block 310 the method 300 detects if HCCI operation is being used. If not, the method ends or may also continually loop in block 310 until HCCI operation is entered. When HCCI operation is detected in block 310, split cylinder operation/cylinder deactivation is determined in block 320. If there is no split cylinder operation/cylinder deactivation, for example if all cylinders are operating in HCCI combustion mode, then the method proceeds to block 330 and actuates valves to control HCCI combustion.

If split cylinder operation/cylinder deactivation is detected in block 320, then the method proceeds to decision block 340 and if a transient condition or transition event in HCCI operation is not detected, the method proceeds to end. In some embodiments, method 300 may loop back to decision block 340 until a transient or transition event is detected. A transient event may be due to torque variations caused by the HCCI cylinders, by external transient inputs, etc. If a transient or transition event is detected in block 340, then at least one valve 52 is opened or closed to adjust pumping losses. In some embodiments, one or more valves may be opened or closed to adjust brake torque. Method 300 may actuate the valves in similar fashion to that disclosed above with respect to system 10.

In block 360, the present embodiment determines if the pumping losses generated by opening or closing valves in the deactivated cylinders in block 350, provides adequate torque smoothing. In some embodiments, if the magnitude of an undesired torque pulse from the transient event can be measured or predicted, the method 300 can adjust the pumping losses or brake torque of one or more cylinders to at least partially compensate for the undesired torque and provide a more smooth torque delivery. In this way, a calibrated response to a detected or imminent transient or transitional event may be determined beforehand and be used with or without decision block 360. If adequate torque smoothing was not provided for, then in block 370 one or more valves of the deactivated cylinder(s) is further actuated to provide adequate torque smoothing.

Figure 4:
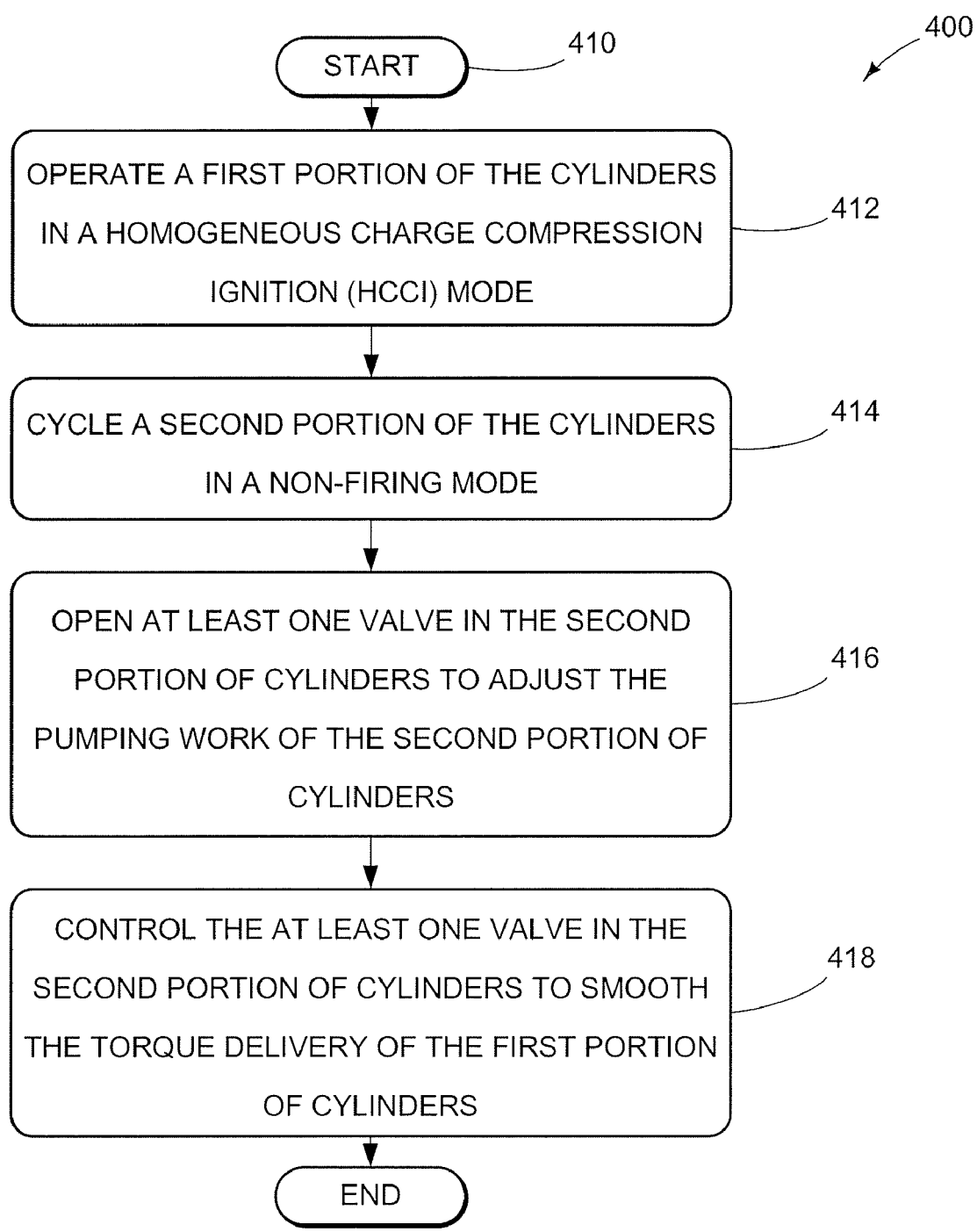
FIG. 4 is a flow diagram of another embodiment method to control torque delivery in a homogeneous charge compression ignition engine having a plurality of cylinders using electronic valve actuation.

FIG. 4 is a flow diagram of another embodiment method 400 to control torque delivery in a homogeneous charge compression ignition engine having a plurality of cylinders using electronic valve actuation. After beginning in block 410, method 400 operates a first portion of cylinders in an engine in an HCCI combustion mode, as illustrated in block 412. In block 414, the method cycles a second portion of cylinders in the engine in a non-firing mode. In an example, a non-firing mode may involve ceasing sparking and fueling of the non-firing cylinder. In block 416, at least one valve is opened in the second portion of cylinders in order to adjust the pumping work of the second portion of cylinders. The pumping work may be adjusted as described in reference to system 10 or method 300 above. After the at least one valve is opened, method 400 adjusts the actuation of the at least one valve in the second portion of cylinders to smooth the torque delivery of the first portion of cylinders, as illustrated in block 418.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method for controlling torque delivery in a homogeneous charge compression ignition engine having a plurality of cylinders using electronic valve actuation, comprising:
   operating a first portion of the cylinders in a homogeneous charge compression ignition (HCCI) mode;
   cycling a second portion of the cylinders in a non-firing mode;
   actuating at least one valve in the second portion of cylinders to adjust the pumping work of the second portion of cylinders; and
   adjusting the actuation of the at least one valve in the second portion of cylinders to smooth the torque delivery of the engine.

2. The method of claim 1, wherein adjusting at least one valve in the second portion of cylinders involves adjusting at least one of valve timing, duration and lift of the at least one valve.

3. The method of claim 1, further comprising:
   detecting a transient event in the first portion of cylinders; and
   adjusting at least one of valve timing, duration and lift of the at least one valve in the second portion of cylinders according to the transient event in the first portion of cylinders.

4. The method of claim 1, further comprising:
   detecting a transition of the first portion of cylinders to or from an HCCI mode; and
   adjusting at least one of valve timing, duration and lift of the at least one valve in the second portion of cylinders according to the transition of the first portion of cylinders.

5. The method of claim 1, wherein the at least one valve is an intake valve.

6. The method of claim 1, further comprising adjusting at least one intake valve and one exhaust valve in the second portion of cylinders to smooth the torque delivery of the engine.

7. The method of claim 1, wherein the at least one valve in the second portion of cylinders is actuated to provide brake torque to smooth the torque delivery of the engine.

8. A system for controlling a multiple cylinder internal combustion engine having a plurality of cylinders with electronically actuated valves, comprising:
   a first portion of cylinders to operate in a homogeneous charge compression ignition (HCCI) mode;
   a second portion of cylinders to operate in a non-firing mode; and
   an engine controller operably coupled to electronically actuated valves of the first and second portions of cylinders, said controller configured to actuate at least one valve in the second portion of cylinders to adjust the pumping work of the second portion of cylinders, wherein the engine controller is configured to adjust the actuation of the at least one valve in the second portion of cylinders to smooth the torque delivery of the engine.

9. The system of claim 8, wherein the engine controller is configured to adjust at least one of valve timing, duration and lift of the at least one valve in the second portion of cylinders to smooth the torque delivery of the engine.

10. The system of claim 8, wherein the engine controller is further configured to detect a transient event in the first portion of cylinders, and adjust at least one of valve timing, duration and lift of the at least one valve in the second portion of cylinders according to the transient event in the first portion of cylinders.

11. The system of claim 8, wherein the engine controller is further configured to detect a transition to or from and HCCI mode in the first portion of cylinders, and adjust at least one of valve timing, duration and lift of the at least one valve in the second portion of cylinders according to the transition of the first portion of cylinders.

12. The system of claim 8, wherein the at least one valve is an intake valve.

13. The system of claim 8, wherein the engine controller is further configured to adjust at least one intake valve and one exhaust valve in the second portion of cylinders to smooth the torque delivery of the engine.

14. The system of claim 8, wherein the at least one valve in the second portion of cylinders is actuated to provide brake torque to smooth the torque delivery of the engine.

15. A non-transitory computer storage medium having instructions encoded therein for controlling torque delivery in a homogeneous charge compression ignition engine having a plurality of cylinders using electronic valve actuation, said medium comprising:
   code to operate a first portion of the cylinders in a homogeneous charge compression ignition (HCCI) mode;
   code to cycle a second portion of the cylinders in a non-firing mode;
   code to actuate at least one valve in the second portion of cylinders to adjust pumping work of the second portion of cylinders; and
   code to adjust the actuation of the at least one valve in the second portion of cylinders to smooth the torque delivery of the engine.

16. The medium of claim 15, wherein adjusting at least one valve in the second portion of cylinders involves adjusting at least one of valve timing, duration and lift of the at least one valve.

17. The computer storage medium of claim 15, the medium comprising code to detect a transient event in the first portion of cylinders, and adjust at least one of valve timing, duration and lift of the at least one valve in the second portion of cylinders according to the transient event in the first portion of cylinders.

18. The medium of claim 15, the medium comprising code to detect a transition to or from an HCCI mode in the first portion of cylinders, and adjust at least one of valve timing, duration and lift of the at least one valve in the second portion of cylinders according to the transition of the first portion of cylinders.

19. The non-transitory computer storage medium of claim 15, wherein the at least one valve is an intake valve.

20. The medium of claim 15, further comprising code to adjust at least one intake valve and one exhaust valve in the second portion of cylinders to smooth the torque delivery of the engine.

21. The medium of claim 15, wherein the at least one valve in the second portion of cylinders is actuated to provide brake torque to smooth the torque delivery of the engine.

22. A method for controlling torque delivery in a homogeneous charge compression ignition (HCCI) engine having a plurality of cylinders, comprising:
   operating a first portion of the cylinders in an HCCI mode;
   cycling a second portion of the cylinders in a non-firing mode;
   adjusting pumping work of a cylinder in the second portion by actuating an electric intake valve coupled to the cylinder while adjusting valve actuation timing to smooth engine torque delivery.

\* \* \* \* \*